United States Patent
Daicho et al.

(10) Patent No.: US 6,960,005 B2
(45) Date of Patent: Nov. 1, 2005

(54) VEHICLE HEADLAMP APPARATUS

(75) Inventors: Yoshinao Daicho, Shizuoka (JP); Shigetoshi Kajiyama, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 18 days.

(21) Appl. No.: 10/657,346

(22) Filed: Sep. 8, 2003

(65) Prior Publication Data

US 2004/0052083 A1 Mar. 18, 2004

(30) Foreign Application Priority Data

Sep. 12, 2002 (JP) .................................. P.2002-266811

(51) Int. Cl.[7] ................................................ F21V 1/00

(52) U.S. Cl. ........................ 362/466; 362/465; 362/525

(58) Field of Search ................................ 362/5, 11, 43, 362/525, 526, 464–466; 315/77–82

(56) References Cited

U.S. PATENT DOCUMENTS 6,254,259 B1   7/2001   Kobayashi
6,817,740 B2 * 11/2004   Kobayashi et al. ......... 362/466

FOREIGN PATENT DOCUMENTS

JP   2001-118407    4/2001
JP   2001-325816   11/2001

* cited by examiner

*Primary Examiner*—Stephen F Husar
(74) *Attorney, Agent, or Firm*—Fish & Richardson P.C.

(57) ABSTRACT

A vehicle headlamp apparatus 10 comprising a headlamp 3 for illuminating ahead of a subject vehicle 1, an image capture means 2 for capturing an image 21 ahead of the subject vehicle, a road terminal end determining means 19 for determining a terminal end of a road ahead of the subject vehicle from the image captured by the image capture means, and a light distribution control means 12 for varying a light distribution of the head lamp so as to illuminate a location which is determined to be the terminal end of the road by the road terminal end determining means.

11 Claims, 13 Drawing Sheets

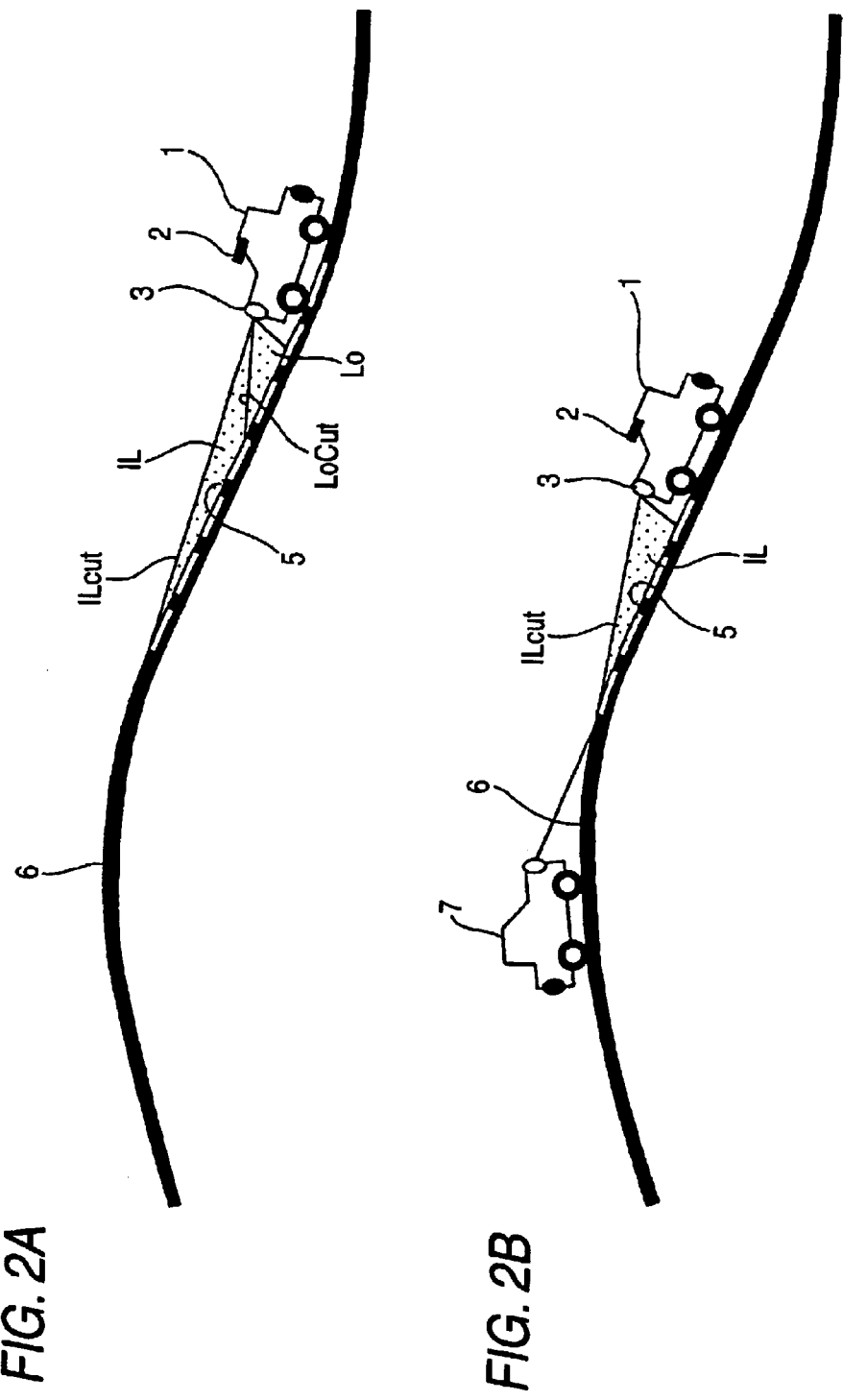

VEHICLE HEADLAMP APPARATUS

BACKGROUND OF THE INVENTION

The present invention relates to a novel vehicle headlamp apparatus. More particularly, the invention relates to a technique which ensures an optimum driving path illumination despite the existence of a leading vehicle and/or an oncoming vehicle.

Conventionally, in a vehicle such as an automobile, the illumination of a driving path is implemented by headlamps thereof, and beams used for light distribution of the headlamp are roughly classified into a high beam and a low beam.

The high beam is a beam for illuminating ahead mainly in a situation as found in a suburban area where there are fewer pedestrians and there exist near a subject vehicle no leading vehicle which drives ahead of the subject vehicle in the same driving direction and oncoming vehicle which drives in an opposite driving direction to that of the subject vehicle, as well as for illuminating as far as above an axis (referred to as an "optical axis at the normal time") which passes through a center of the headlamp and extends in a longitudinal direction while kept parallel to a flat driving path in a normal state or in a state in which the subject vehicle is driving on the flat driving path in a normal condition or in a condition where the vehicle is inclined neither forward nor backward, whereby the high beam can illuminate a farther area of the driving path. On the other hand, the low beam is a beam used when the subject vehicle is driving in an urban area where there are many pedestrians, as well as in a situation where there exist leading vehicles and/or oncoming vehicles near the subject vehicle to illuminate ahead with no glare (dazzling light) being imparted to people near the subject vehicle or the drivers of the leading and oncoming vehicles and the pedestrians. The low beam has a cut-off line (an upper limit line) which extends substantially horizontally in the vicinity of or slightly below a line which horizontally extends across the optical axis at the normal time in a part of an illuminating range of the headlamp which is situated on a right side of the illuminating range in a transverse direction of the vehicle (the contour of the cut-off line of the low beam is such as to be applied to a case where left-hand driving is mandated, and in a case where right-hand driving is mandated, a contour is adopted which is symmetrically opposite to this contour in a transverse direction). Consequently, as long as the low beam is used, it is possible at the normal time to avoid such risks that an inside rearview mirror or an outside rearview of the leading vehicle is illuminated to thereby give a glare to the driver of the leading vehicle, that the driver of the oncoming vehicle is directly illuminated to thereby be given a glare, and that pedestrians are given a glare.

Then, the high beam and the low beam are switched over manually by the driver.

With the manual switching, however, there is case that switching is not implemented at an appropriate time, leading to another risk that people near the subject vehicle are given a glare (in the event that switching to the low beam is not implemented at a right time) or a risk that sufficient illumination is not provided ahead of the subject vehicle to thereby cause a problem of driving safety (in the event that switching to the high beam is not implemented at a right time)

Then, there has been proposed an automatic headlamp light distribution switching system in which the existence of leading and oncoming vehicles and distances from a subject vehicle to the leading and oncoming vehicles are detected based on image information captured by an image capture means and distance information captured by using a sensor such as a laser radar and a millimeter wave radar, respectively, whereby when there exist leading and oncoming vehicles within a predetermined distance range from the subject vehicle, switching to a low beam is carried out, whereas when there is no leading and oncoming vehicles within the predetermined distance range from the subject vehicle, the low beam is then switched to a high beam. By this construction, a case is avoided that the subject vehicle is driving with the headlamps set on high beam although there exist leading and oncoming vehicles or that only a road surface slightly ahead of the subject vehicle is illuminated although there exist no leading and oncoming vehicles and the subject vehicle is driving at high speed, thereby making it possible to ensure the safety of traffic.

However, with the aforesaid automatic headlamp light distribution switching system, although there is caused no problem while driving on a flat driving path or road, in a special driving condition, there is caused a problem that the safety of traffic is endangered by the automatic switching on the contrary.

As shown in FIG. 14, for example, with a subject vehicle "a" driving on a flat road, in the event that another vehicle "c" exists out of a detection area by a sensor "b" provided on the subject vehicle "a", a high beam Hi is illuminated, and as a result, a glare is imparted to the driver of the other vehicle "c" and a pedestrian "d" who is difficult to be detected. This is a kind of problem that is caused by the capability of the sensor "b", and there is a limit on a distance within which leading and oncoming vehicles can be detected. Even when the other vehicle "c" exists at an area beyond such a limit, the high beam Hi is directed toward the other vehicle "c", and this may cause a risk that a glare is given to the driver of the other vehicle. Incidentally, when a low beam Lo is illuminated, due to the position of a cut-off line thereof there is caused no risk that a glare is given to the other vehicle "c" and the pedestrian "d".

In addition, as shown in FIG. 15, when the subject vehicle "a" is climbing a hill, another vehicle "e" located on an opposite side of the hill to the subject vehicle "a" cannot be detected by the sensor "b" near the top of the hill, and hence the high beam Hi is illuminated. In this situation, when the other vehicle "e" suddenly appears at the top of the hill, the driver of the other vehicle "e" is hit with a glare.

Furthermore, when considering the driving safety of the subject vehicle, in both the cases illustrated in FIGS. 14 and 15, an area of the road surface which is located far ahead of the subject vehicle "a" cannot be illuminated with the low beam, and hence there is caused a problem with a high-speed driving. For example, in the case of FIG. 14, even in the event that a beam IL is emitted whose cut-off line IL cut exists at the detection limit position of the sensor "b", there is caused no risk that the glare is given to the other vehicle "c" and the pedestrian "d". In addition, in the case of FIG. 15, a road illumination up to the top of the hill which is a limit of the visional range of the driver of the subject vehicle can be achieved by emitting a beam IL whose cut-off line ILcut is positioned at the top of the hill, and even where the other vehicle "e" suddenly appears at the top of the hill, there is caused no risk that the driver of the other vehicle "e" is hit with the glare.

SUMMARY OF THE INVENTION

Then, an object of the invention is to ensure the driving safety of the subject vehicle with no glare being imparted to people near the subject vehicle by illuminating a farthest area within the visional range of the driver of the subject vehicle when no leading and oncoming vehicles are detected.

With a view to achieving the object, according to the invention, there is provided a vehicle headlamp apparatus comprising a headlamp for illuminating ahead of a vehicle, an image capture means for capturing an image ahead of the vehicle, a road terminal end determining means for determining a terminal end of a road ahead of the vehicle from the image captured by the image capture means, and a light distribution control means for varying a light distribution of the head lamp so as to illuminate a location which is determined to be the terminal end of the road by the road terminal end determining means.

Consequently, in the vehicle headlamp apparatus according to the invention, since when the terminal end of the road is determined, the location of the road which is determined to be the terminal end of the road is illuminated, the headlamp illuminates by no means a location which is too far to be determined to be the terminal end of the road from the image captured by the image capture means, and therefore, there is caused no risk that a glare is given to a vehicle which exists out of the detection area of the image capture means, as well as a vehicle which suddenly appears from the opposite side of the hill to the subject vehicle at the top thereof. Moreover, a farthest point of the detection area of the image capture means ahead of the subject vehicle can be illuminated as long as no leading and ongoing vehicles exist ahead of the subject vehicle, whereby the traffic safety of the subject vehicle is ensured.

BRIEF DESCRIPTION OF DRAWINGS

FIGS. 2A and 2B are drawings which explains light distribution controls occurring while the vehicle is climbing a hill towards a top thereof;

DETAILED DESCRIPTION OF THE PREFERRED EMBODIMENTS

Firstly, a basic concept of the invention will be described.

When there exist leading and oncoming vehicles, it is necessary to switch to a low beam so that no glare is given to drivers of the leading and oncoming vehicles, respectively.

On the other hand, when there exist no leading and oncoming vehicles ahead, since there is little possibility that a glare is given to surroundings of the subject vehicle, it is desired to spread as long as possible the light distribution of the headlamp in a longitudinal direction (ahead of the subject vehicle) so as to brightly illuminate as far an area of the driving path as possible.

Then, when there exist no leading and oncoming vehicles, it is conceived that the low beam is automatically switched to a high beam.

In such a case, however, as has been described above, it is conceivable that a glare is given to pedestrians and bicycles which may not be able to be detected by the image capture means and further vehicles which exist out of the detection area. In addition, when an oncoming vehicle appears near the top of a hill, a strong glare is given to the oncoming vehicle.

It is not always good that a reaching distance of illumination on the driving path becomes as far as possible. Namely, this is because it is no use illuminating an area which is too far to be visualized by the driver. The same holds true as to the image capture means. Even in the event that an illumination with a predetermined illumination intensity or greater is attained, no recognition by the image capture means is attained due to the capability of the image capture means, or it is meaningless to illuminate an area which is too far to be visualized by the driver due to its visual acuity. On the contrary, it is meaningless to spread the cut-off line to a range that can only be illuminated with a light whose illumination intensity is too low for the driver and the image capture means to recognize an image therein.

Then, it can be said that with the recognition capability of the image capture means being set substantially the same as the visual acuity (for example, twenty/twenty vision) of the driver (virtual), an illumination of a farthest area that the image capture means can recognize is sufficient.

Namely, when the existence of a leading vehicle and/or an oncoming vehicle is detected, switching to the low beam is carried out so that no glare is given to the leading vehicle and/or the oncoming vehicle, and when the existence of a leading vehicle and/or an oncoming vehicle cannot be detected, with the cut-off line being controlled to be positioned at a farthest area of the driving path that the image capture means can recognize, the driving path ahead can be illuminated as far as visualization is made possible, and since the cut-off line is provided, even in the event that there exists an oncoming vehicle out of the detection area of the image capture means, there is caused no risk that a glare is given to the oncoming vehicle.

Figure 1A:
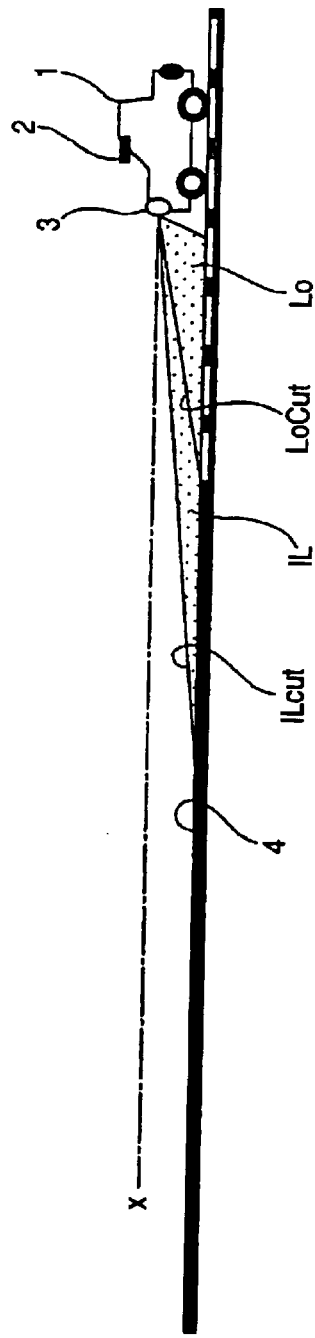
FIG. 1A and 1B show together with FIGS. 2A and 2B a concept of a light distribution of a vehicle headlamp apparatus according to the invention and explains light distribution controls while a vehicle is driving on a flat road.
Figure 1B:
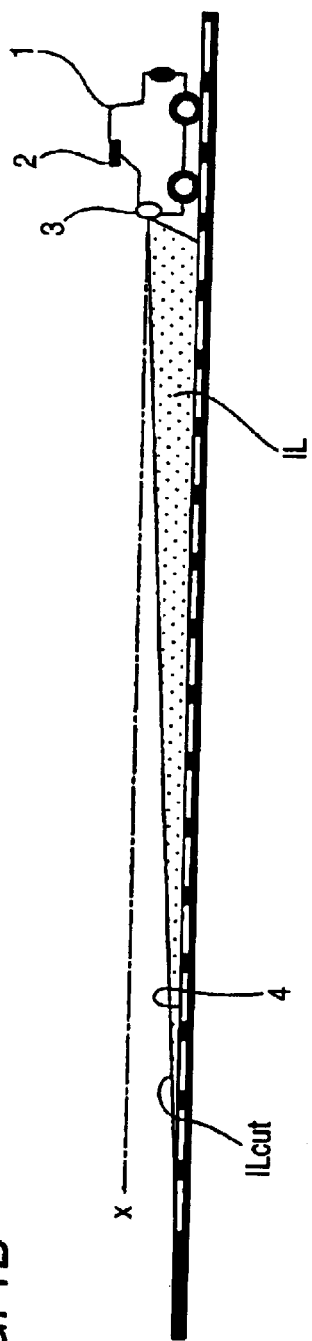
Figure 4:
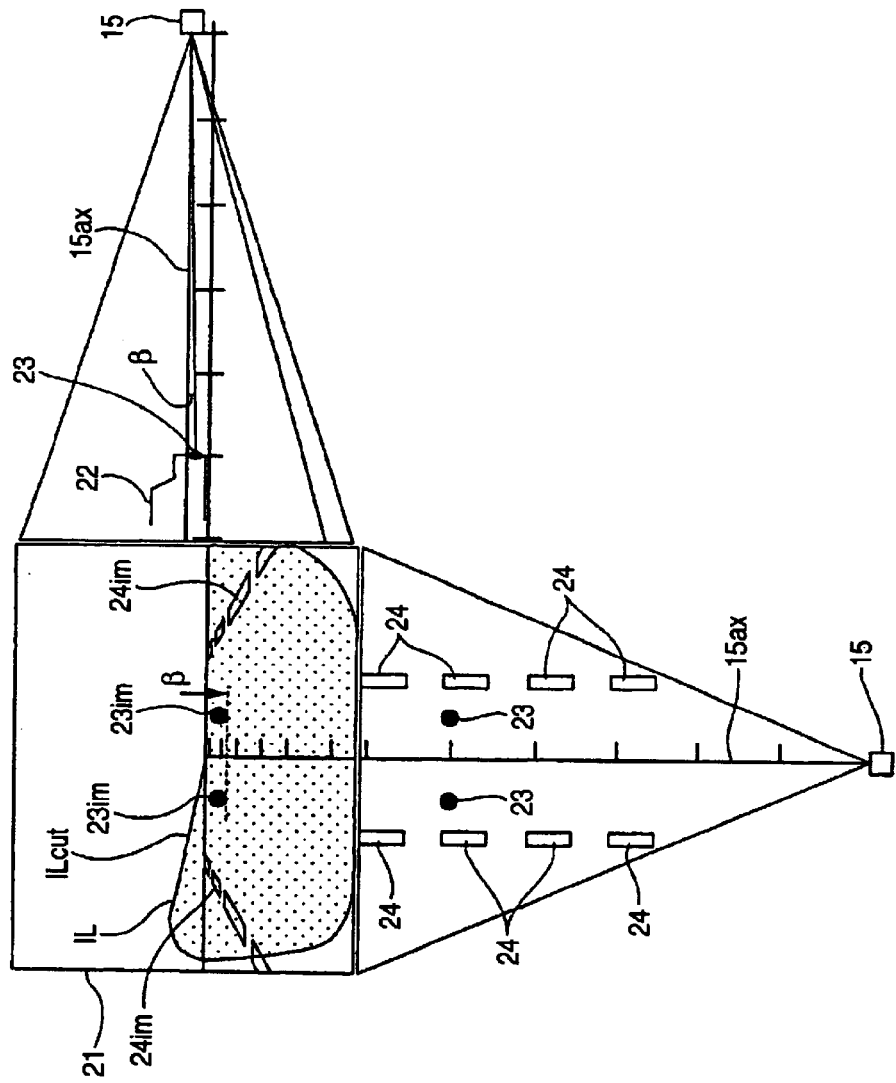
FIG. 4 is a drawing which shows an image recognition method for recognizing the existence and non-existence of leading and oncoming vehicles, a plan view of a driving path as viewed from the top being shown below the image, a side view of the driving path as viewed from the left being shown on a right side of the image.

Then, in the invention, as a specific approach, when leading and oncoming vehicles exist ahead of a subject vehicle 1, switching to a low beam Lo (LoCut denotes a cut-off line of the low beam) is carried out, whereas when no leading and oncoming vehicles are detected, a beam IL is designed to be emitted whose cut-off line ILcut is raised to a limit angle attained by raising gradually the cut-off line from the position of the cut-off line LoCut of the low beam Lo (refer to FIG. 1A) and at which the boundary of the road can be captured by an image capture means 2 from surrounding structures such as white lines and guard rails or an angle attained by raising slightly the cut-off line from the limit angle so as to improve the visibility (refer to FIGS. 1B, 4).

Namely, in the event that there exist no leading and oncoming vehicles and that no image at a farthest area of the white line or the road within an illumination range of the headlamp 3 of the subject vehicle is captured, the field of view for the road surface and space ahead of the vehicle is expanded by raising the cut-off line in stages or continuously with an actuator for controlling the cut-off line. Then, while confirming the capture by the image capture means, the cut-off line is controlled to the limit angle at which the white line or the boundary of the road is captured. In other words, the cut-off line is controlled to be raised to the angle at which the white line and the road, as well as the road boundary which consists of the surrounding structures cannot be visualized by the image capture means to thereby spread the illumination range.

For example, on a flat road 4 provided with white lines, the cut-off line is raised and is controlled to reach the limit angle at which a white line can be captured by the image capture means. In addition, on a road where no white line is provided, the cut-off line is raised while capturing the road and the road boundary which consist of a guard rail, a pavement and buildings, and the cut-off line ILcut is controlled to reach the limit angle at which the image capture means can capture the road and road boundary or to the angle attained by raising slightly the cut-off line from the limit angle for improvement in visibility.

In addition, on a hill or upward slope 5, even if the capability of the image capture means 2 allows a farther area than a top 6 of the hill to fall within a detection area of the image capture means 2, since part of the white line and other surrounding structures showing the road boundary which are located farther than the top 6 go out of the field of view, the image capture means 2 can only capture images of the white line and the road boundary as far as near the top of the hill. Consequently, the cut-off line ILcut of the beam IL is located near the top (refer to FIG. 2A), and since the end of the road, the farthest area of the white line and the farthest area of the road boundary move toward the subject vehicle 1 as the subject vehicle 1 approaches the top 6, the cut-off line ILcut is lowered gradually (refer to FIG. 2B), and therefore, even in the event that an oncoming vehicle 7 appears near the top of the hill, there is caused no risk that a glare is given to the oncoming vehicle.

Additionally, since the cut-off line ILcut of the beam IL is directed to the road surface, the cut-off line ILcut has an angle which declines relative to an optical axis (an axis which passes through the center of the headlamp 3 and extends in a longitudinal direction in parallel with the road surface) x—x of the headlamp 3 as it goes ahead farther, and there is caused no risk that a glare is given to the leading and oncoming vehicles which exist out of the detection area of the image capture means 2 or pedestrians which are difficult to be detected. Furthermore, even in the event that a leading vehicle or an oncoming vehicle suddenly appears near the subject vehicle at an intersection, a reversing distance along which the cut-off line is reversed to the position of the cut-off line of the low beam is so short that the driver is not endangered or discomforted.

By implementing the aforesaid controls during driving, an optimum visual environment can be obtained even when there exist no leading and oncoming vehicles.

Here, the case where the farthest area of the white line, the farthest area of the road or the farthest area of the road boundary is not captured within the illuminating range of the headlamp of the subject vehicle means a case where a farther end of the white line, the condition of the road at a farther area thereof or the road boundary at a farther area thereof which is each illuminated by the headlamps and is captured by the image capture means disappears relatively sharply with a certain contrast ratio. In this case, although the farther end of the white line, the condition of the road at the farther end thereof or the road boundary at the farther end thereof continues to run farther, it is considered that no image thereof is not captured due to insufficient illumination intensity caused by the cut-off line. On the contrary, a case where an image at the farthest area of the white line or at the farthest area of the road is captured within the illuminating range of the headlamp of the subject vehicle means a case where the farther end of the white line, the condition of the road at the farther area thereof or the road boundary at the farther area thereof which is each illuminated by the headlamps and is captured by the image capture means disappears gradually with a low contrast ratio.

However, while the white line disappears with sharpness near the top of the hill, since a portion of the white line which continues to run farther is not found even if the cut-off line is raised, the cut-line is raised by no means higher than that.

In addition, in the event that the non-existence of leading and oncoming vehicles can be confirmed by the image capture means on a curved road, the optical axis of the headlamp can be swiveled (turned transversely) according to a traveling path or road which is estimated from a steered angle of a steering wheel or the image capture means while the cut-off line remains raised. Thus, it is possible to illuminate a wider range of road surface and space than a range thereof that would result when the optical axis of the headlamp is swiveled in the low beam condition.

By implementing the light distribution control in the longitudinal direction (a direction in which it goes farther away from or comes closer to the vehicle on the road ahead thereof) as has been described above, not only can a light distribution control which is highly visible and safe to the driver be realized but also the farther areas of the white line and road surface can be illuminated quickly and brightly.

However, in the event that the function of the image capture means is deteriorated by a change in the surrounding environment, which then triggers a deterioration in sensing accuracy, the longitudinal and transverse control by the image capture means is stopped and switching to the normal low beam is implemented.

According to the invention, a light distribution control suitable for the surrounding traffic environment and road conditions can be implemented despite the existence and non-existence of leading and oncoming vehicles, and the visibility can be improved with no glare being imparted to the surroundings.

Note that while in the above description, switching to the low beam is implemented when leading and oncoming vehicles are recognized, the invention is not limited to the switching to the low beam, and instead, the cut-off line may be controlled according to the position of the leading and oncoming vehicles so recognized so as to be located at a position where there is caused no risk that a glare is given to the leading and oncoming vehicles, thereby making it possible to illuminate ahead of the subject vehicle more widely with no glare being given to the leading and oncoming vehicles.

An embodiment of a vehicle headlamp apparatus according to the invention will be described below.

Figure 3:
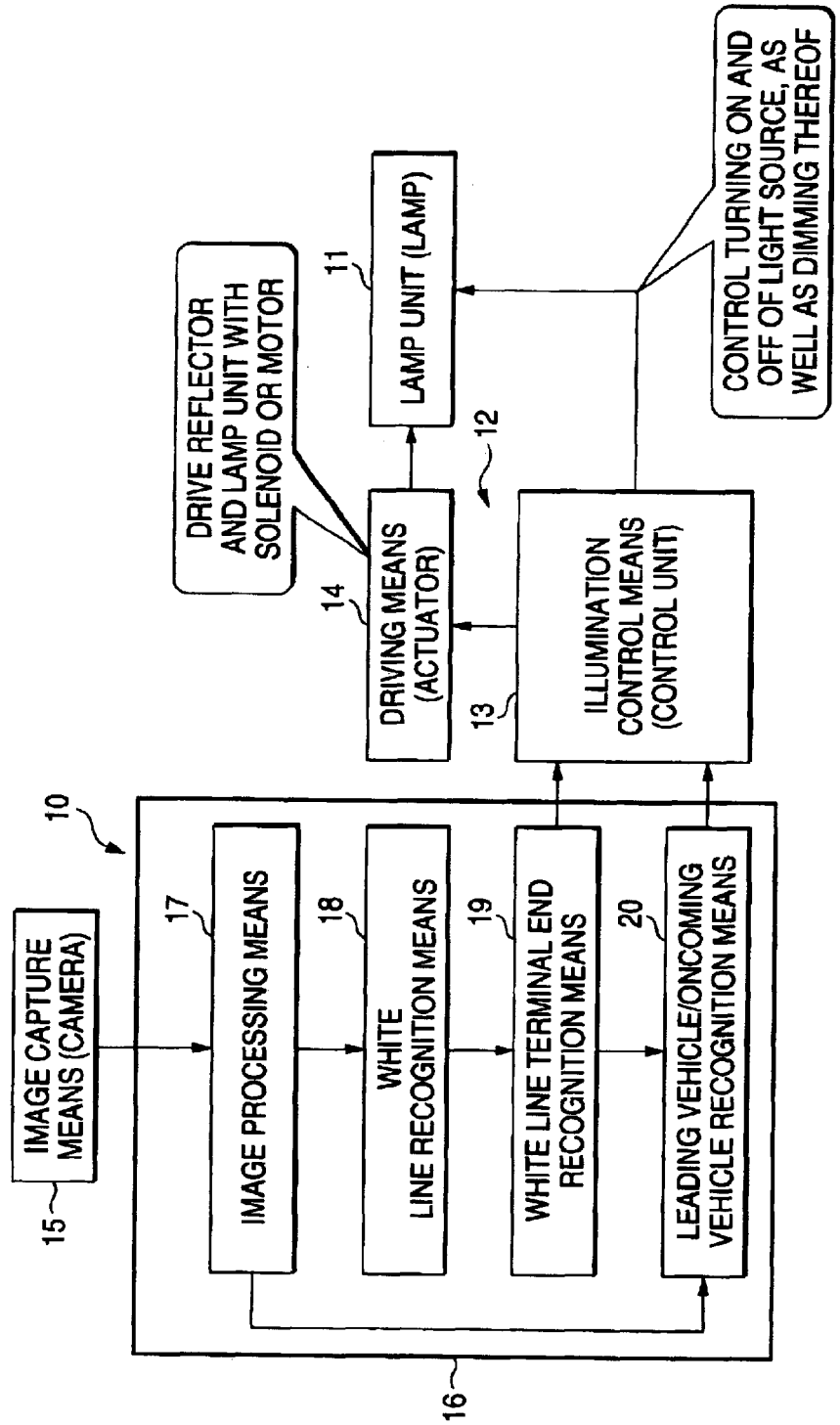
FIG. 3 is a drawing which explains together with FIGS. 4 to 13 an embodiment of the vehicle headlamp apparatus according to the invention and which is a block diagram showing the overall configuration of the system.

The overall configuration of a vehicle headlamp apparatus according to the invention will be shown in FIG. 3.

A vehicle headlamp apparatus 10 includes a headlamp 11. The headlamp 11 is such as to emit a beam having a cut-off line. Here, the cut-off line means, as has been described above, a clear, bright and dark areas defining boundary line which defines an upper limit of a light distribution or a boundary line which defines a bright area below the cut-off line and a dark area above the cut-off line. Normally, the cut-off line extends horizontally be low a horizontal line which intersects an optical axis of the headlamp 11 at a right side part thereof in the transverse direction of the vehicle and inclines upwardly toward a left side at a left side part thereof. The contour of the cut-off line is not, of course, limited to this contour, and a cut-off line of any contour may be used provided that any illumination which gives a glare to leading and oncoming vehicles is not provided above the cut-off line. For example, a cut-off line of a beam which is referred to as a Z-beam has a contour in which a right side part which extends horizontally below a horizontal line which intersects the optical axis on a right side in the transverse direction of the vehicle and a left side part which extends horizontally at a position slightly above the right side part on a left side in the transverse direction of the vehicle are connected to each other by a central portion which inclines upwardly toward the left side.

There can be adopted various methods for forming beams having the aforesaid cut-off lines. For example, there is a method in which a bulb is combined with a reflector which is designed to reflect light from the bulb slightly downwardly, and a screen is provided for concealing substantially a lower half part of a light emitting portion (for example, a filament) of the bulb relative to the reflector, so that a cut-off line is formed by the contour of the screen. In another method, there are provided a light source, a reflector for reflecting light from the light source and condensing the reflected light to a light condensing area and a screen for concealing part of the light so condensed, and a cut-off line is formed by the edge of the screen. Thus, a variety of methods can be adopted (refer to JP-A-2001-325816, JP-A-2001-118407).

A light distribution control means 12 for vertically controlling the cut-off line is related to the headlamp 11. The light distribution control means 12 includes an illumination control means 13 and a driving means (an actuator) 14, and the illumination control means 13 controls the driving means 14 and also controls turning on and off of the headlamp 11, as well as dimming thereof. The driving means 14 is such as to control the vertical movement of the cut-off line of the headlamp 11, and the process of controlling the cut-off line differs depending on methods for forming a cut-off line for the headlamp 11. For example, in a case where a bulb is combined with a reflector which is designed to reflect light from the bulb slightly downwardly, and a screen is provided for concealing substantially a lower half part of a light emitting portion of the bulb relative to the reflector, so that a cut-off line is formed by the contour of the screen, the cut-off line can be moved vertically by vertically tilting the reflector, the bulb and the screen all together. In addition, in another case where there are provided a light source, a reflector for reflecting light from the light source and condensing the reflected light to a light condensing area and a screen for concealing part of the light so condensed, and a cut-off line is formed by the edge of the screen, the cut-off line can be moved vertically by vertically moving the screen. Then, various devices such as a solenoid and a motor can be used as a driving source for the driving means 14.

There are provided an image capture means 15 for capturing an image ahead of a subject vehicle and an image processor 16 for processing the image in order to control the light distribution by driving the light distribution control means 12.

The image capture means 15 may be such as to capture an image ahead of the subject vehicle, and a so-called CCD camera utilizing a solid photographing element such as CCD (charge coupled device) can be used. An image to be captured by the image capture means 15 may be in color or black and white. In addition, only a single camera may be used or two cameras may be used in a stereo fashion. Then, the image capture means 15 is disposed at an appropriate location within the passenger compartment in such a manner as to face ahead. In addition, a center axis of the image capture means 15 is preferably disposed to become parallel with an optical axis of the headlamp 11. In particular, when the center axis of the image capture means 15 is disposed at the same height as that of the optical axis of the headlamp 11, in detecting an angle formed by an object, for example, tail lamps of a leading vehicle and headlamps of an oncoming vehicle and the optical axis of the headlamp 11 of the subject vehicle, no conversion from an angle formed by the center axis of the image capture means 15 and the object is required, and instead, the angle formed by the center axis of the image capture means 15 and the object is directly taken as the angle formed by the optical axis of the headlamp 11 of the subject vehicle and the object. In addition, since information on a distance from the object which would otherwise be required for the aforesaid conversion is no more required, a means for measuring a distance from the object such as a laser radar and a millimeter wave radar are no more required, the configuration of the vehicle headlamp apparatus being thereby simplified.

The image processor 16 includes an image processing means 17 for extracting from an image captured by the image capture means and processing information required for recognition of a terminal end of a road and the existence and non-existence of leading and oncoming vehicles, a white line recognition means 18 for implementing recognition of a white line based on information obtained from the image processing means 17, a white line terminal end recognition means 19 for recognizing a terminal end of the white line based on the result of the recognition implemented by the white line recognition means 18, and a leading vehicle/oncoming vehicle recognition means 20 for recognizing the existence and non-existence of leading and oncoming vehicles based on the information obtained from the image processing means 17.

Then, the results of the recognitions of the white line terminal end recognition means 19 and the leading vehicle/oncoming vehicle recognition means 20 of the image processor 16 are sent out to the illumination control means 13, and the driving means 14 and the headlamp 11 are controlled as has been described above based on the recognition results so sent out.

When leading and oncoming vehicles are recognized by the image capture means 15, switching to a low beam is implemented or the cut-off line is controlled according to a distance from the leading vehicle and the oncoming vehicle.

Referring to FIG. 4, a method for recognizing the existence and non-existence of leading and oncoming vehicles will be described below. Note that in FIG. 4, a view of a driving path as viewed from the top is shown below an image 21 and a view of the driving path as viewed from the left is shown on the right side of the image 21.

The recognition of leading and oncoming vehicles is implemented from, for example, rear lamps of a leading vehicle and headlamps of an oncoming vehicle. A leading vehicle 22 and rear lamps 23, 23 thereof are shown in FIG. 4. In addition, reference numerals 24, 24 denote white lines indicating boundaries of lanes. Then, in the image 21, the rear lamps and the white lines are denoted by reference numerals 23im, 23im and 24im, 24im, 24im, . . . , respectively.

A central axis 15ax of the image capture means 15 is caused to coincide with a center of the image 21, and consequently, the distance of an object positioned from a line which extends horizontally through the center of the image 21 to a lower end of the image 21 can be recognized. Namely, assuming that there are two leading vehicles, a leading vehicles captured at a lower side of the image 21 is understood to be positioned closer to the subject vehicle. In addition, when information on a distance from the subject vehicle to the object is required, since a space between the left and right rear lamps and a space between the headlamps are fixed in most cases, a rough distance from the subject vehicle can be known by counting, for example, the number of pixels between the two rear lamps 23im, 23im in the image 21.

Then, when the existence of leading and oncoming vehicles is recognized in the image 21 from the characteristics of the rear lamps and the headlamps such as a pair of bright points which are spaced apart transversely from each other and which move while keeping the space or the color of the bright points, (1) switching to the low beam is implemented or (2) the cut-off line is controlled to be positioned at a height (an angle relative to the optical axis in a direction in which the cut-off line extends) according to a distance to the leading and oncoming vehicles.

Figure 5:
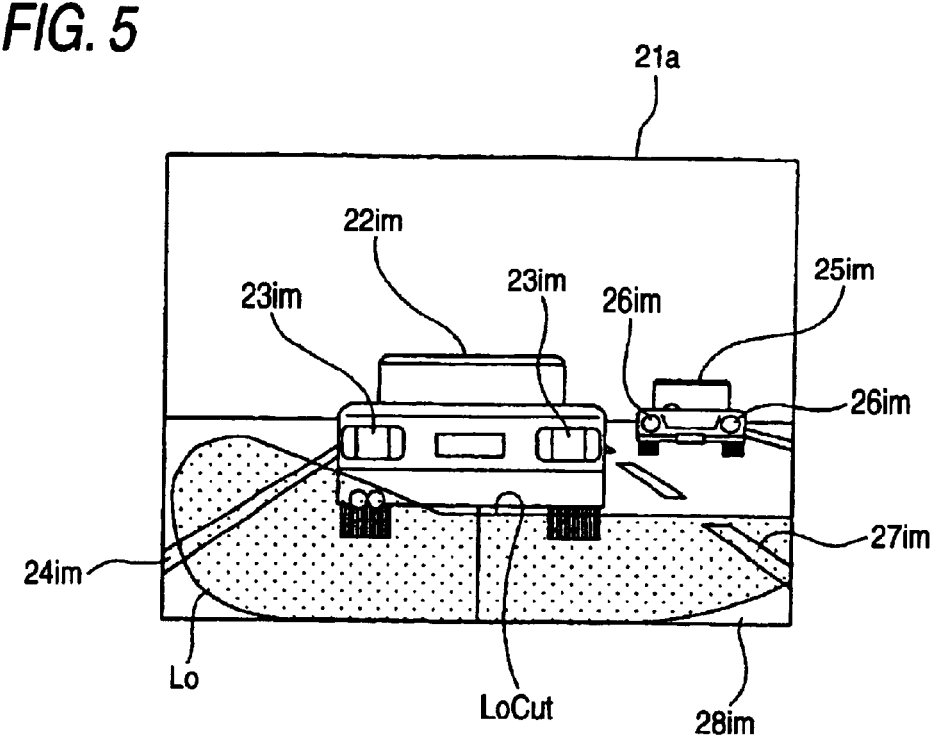
FIG. 5 is a drawing which shows together with FIGS. 6 to 9 a control image of a cut-off line when a leading vehicle and/or an oncoming vehicle is recognized and in which the cut-off line is controlled to be positioned at a cut-off line of a low beam.

FIG. 5 shows an image 21a resulting when the control described under (1) above is implemented. A leading vehicle 22im and an oncoming vehicle 25im are recognized in the image 21a, and a position below rear lamps 23im, 23im of the leading vehicle 22im which is positioned closer to the subject vehicle is illuminated by a low beam Lo (shaded). Namely, a cut-off line LoCut is positioned below the rear lamps 23im, 23im of the leading vehicle 22im, whereby there is caused no risk that a glare is given to the leading and oncoming vehicles.

Figure 6:
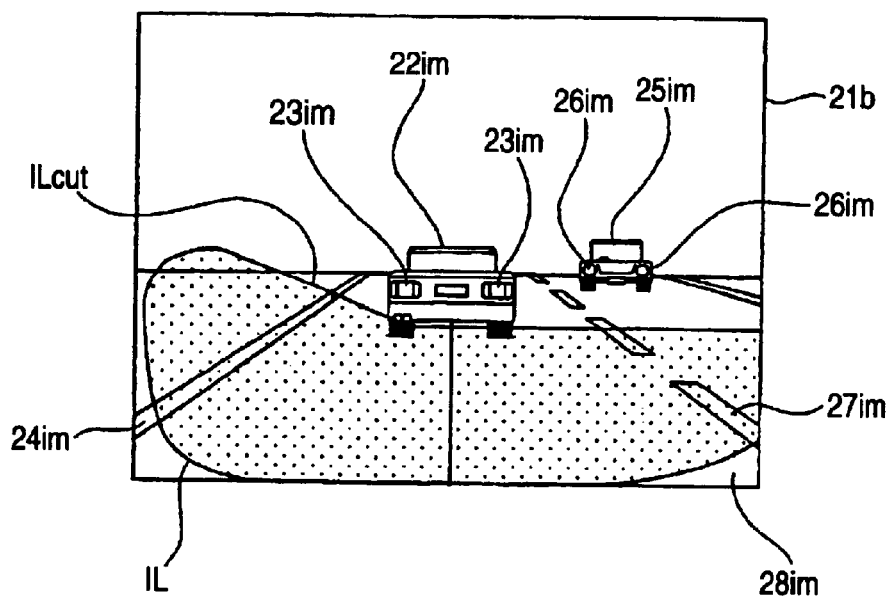
FIG. 6 is a drawing which shows a control of a cut-off line when there exist leading and oncoming vehicles with the cut-off line being controlled using as a standard the leading vehicle which is closer to a subject vehicle.
Figure 7:
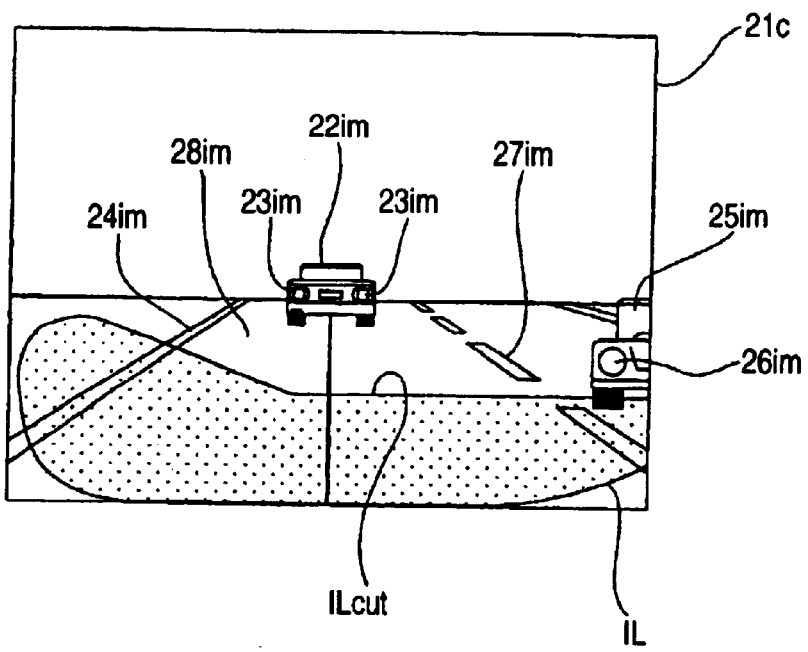
FIG. 7 is a drawing which shows a control of a cut-off line when there exist leading and oncoming vehicles with the cut-off line being controlled using as a standard the oncoming vehicle which is closer to the subject vehicle.
Figure 8:
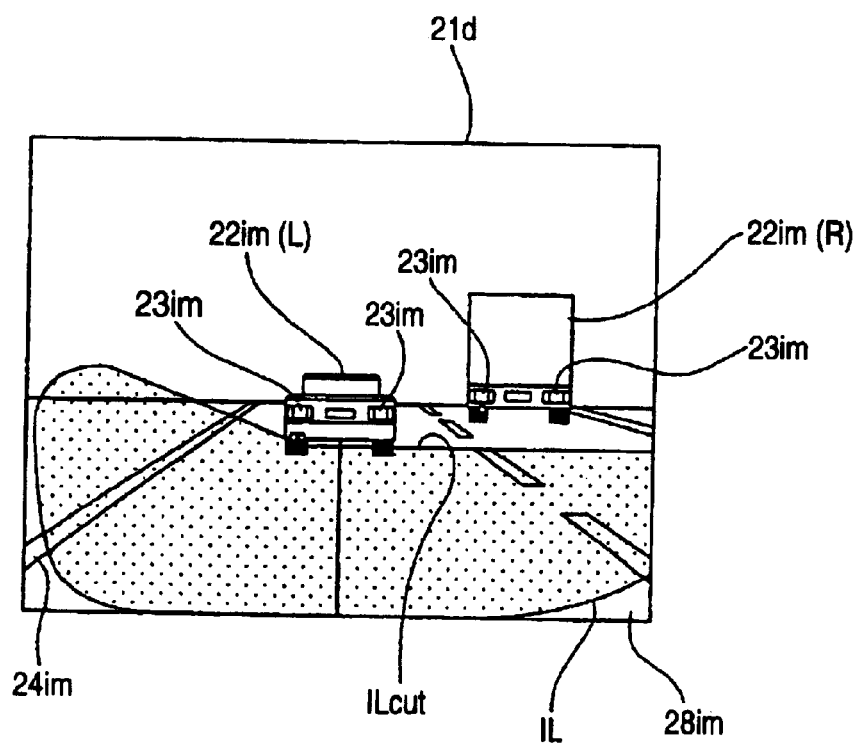
FIG. 8 is a drawing which shows a control of a cut-off line when there exist two leading vehicles with the cut-off line being controlled using as a standard the left leading vehicle which is closer to a subject vehicle.

Next, the control-described under (2) above will be described. When leading and oncoming vehicles are recognized in an image, an angle of elevation or depression β (deg) of rear lamps or headlamps of a vehicle of the leading and oncoming vehicles so recognized which is positioned closest to the subject vehicle relative to the center axis 15ax of the image capture means 15 is obtained (refer to FIG. 4). Note, here, that the center axis 15ax is positioned at the same height as that of the optical axis x—x of the headlamp 11. Then, the position of a cut-off line ILcut of a beam IL (shown as shaded in FIGS. 6 to 8) so that an angle relative to the optical axis x—x in a direction in which the cut-off line ILcut extends becomes equal to or larger than β (deg). The results of the control are shown in FIGS. 6 to 8. Note that when no leading and oncoming vehicles are recognized, a beam IL shown as shaded in FIG. 4 is illuminated.

FIG. 6 shows an image 21b resulting when the leading vehicle 22im and the oncoming vehicle 25im are recognized ahead of the subject vehicle, and since the rear lamps 23im, 23im of the leading vehicle 22im are positioned closer to a lower part of the image 21b than the headlamps 26im, 26im of the oncoming vehicle 25im, the leading vehicle 22im is determined to be an object which is closest to the subject vehicle, and the cut-off line ILcut of the beam IL is controlled to be positioned below the rear lamps 23im, 23im of the leading vehicle 22im.

FIG. 7 also shows an image 21c resulting when the leading vehicle 22im and the oncoming vehicle 25im are recognized ahead of the subject vehicle, and in this case, since the headlamps 26im, 26im of the oncoming vehicle 25im are positioned closer to a lower part of the image 21c than the rear lamps 23im, 23im of the leading vehicle 22im, the oncoming vehicle 25im is determined to be an object closest to the subject vehicle, and the cut-off line ILcut of the beam IL is controlled to be positioned below the headlamps 26im, 26im of the oncoming vehicle.

FIG. 8 shows an image 21d resulting when two leading vehicles 22im(L), 22im(R) are recognized ahead of the subject vehicle. In this case, rear lamps 23im, 23im of the left leading vehicle 22im(L) are positioned closer to a lower part of the image 21d than rear lamps 23im, 23im of the right leading vehicle (R), the left leading vehicle 22im (L) is determined to be an object closest to the subject vehicle, and the cut-off line ILcut of the beam IL is controlled to be positioned below the rear lamps 23im, 23im of the left leading vehicle 22im(L).

Figure 9:
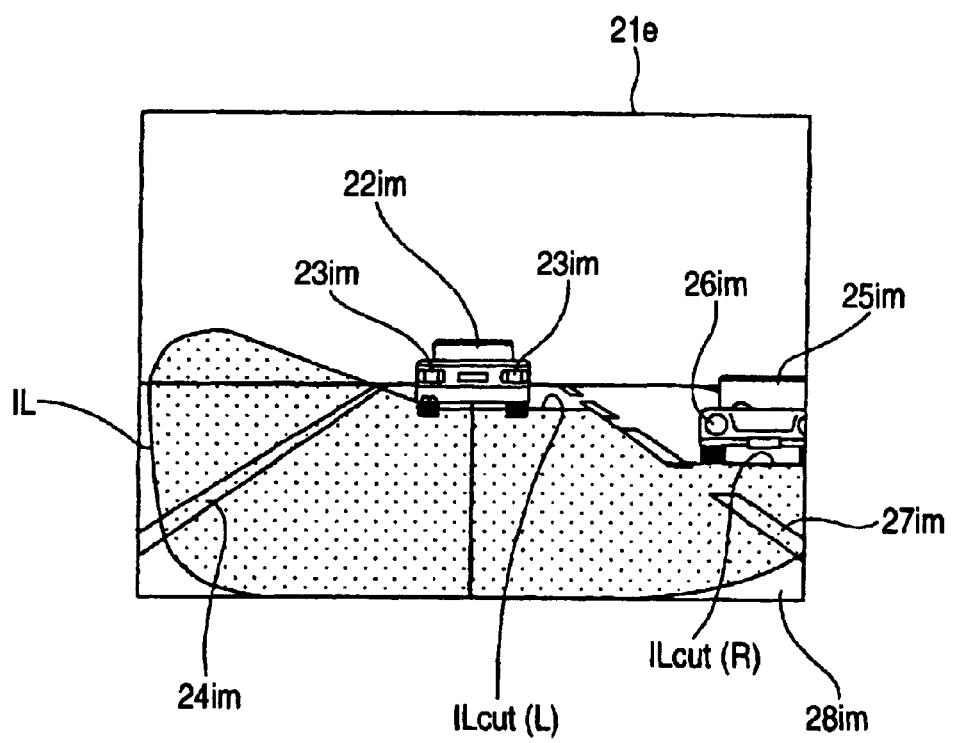
FIG. 9 is a drawing which shows a control of a cut-off line when there exist leading and oncoming vehicles with the cut-off line being controlled using as standards both the leading and oncoming vehicles, respectively.

Note that the cut-off line can be controlled separately for a subject vehicle driving lane and an oncoming vehicle driving lane. For example, this can be attained by dividing the screen for defining the cut-off line into a screen for the subject vehicle driving lane and a screen for the oncoming vehicle driving lane and controlling them so as to move individually. FIG. 9 shows an image 21e of a control example of such a separate cut-off line control, and in the image 21e, a leading vehicle 22im and an oncoming vehicle 25im are being recognized. A cut-off line Ilcout (L) is controlled based on rear lamps 23im, 23im of the leading vehicle 22im on a left side of a centerline 27im, and a cut-off line ILcut (R) is controlled based on headlamps 26im, 26im of the oncoming vehicle 25im on a right side of the centerline 27im.

Figure 10:
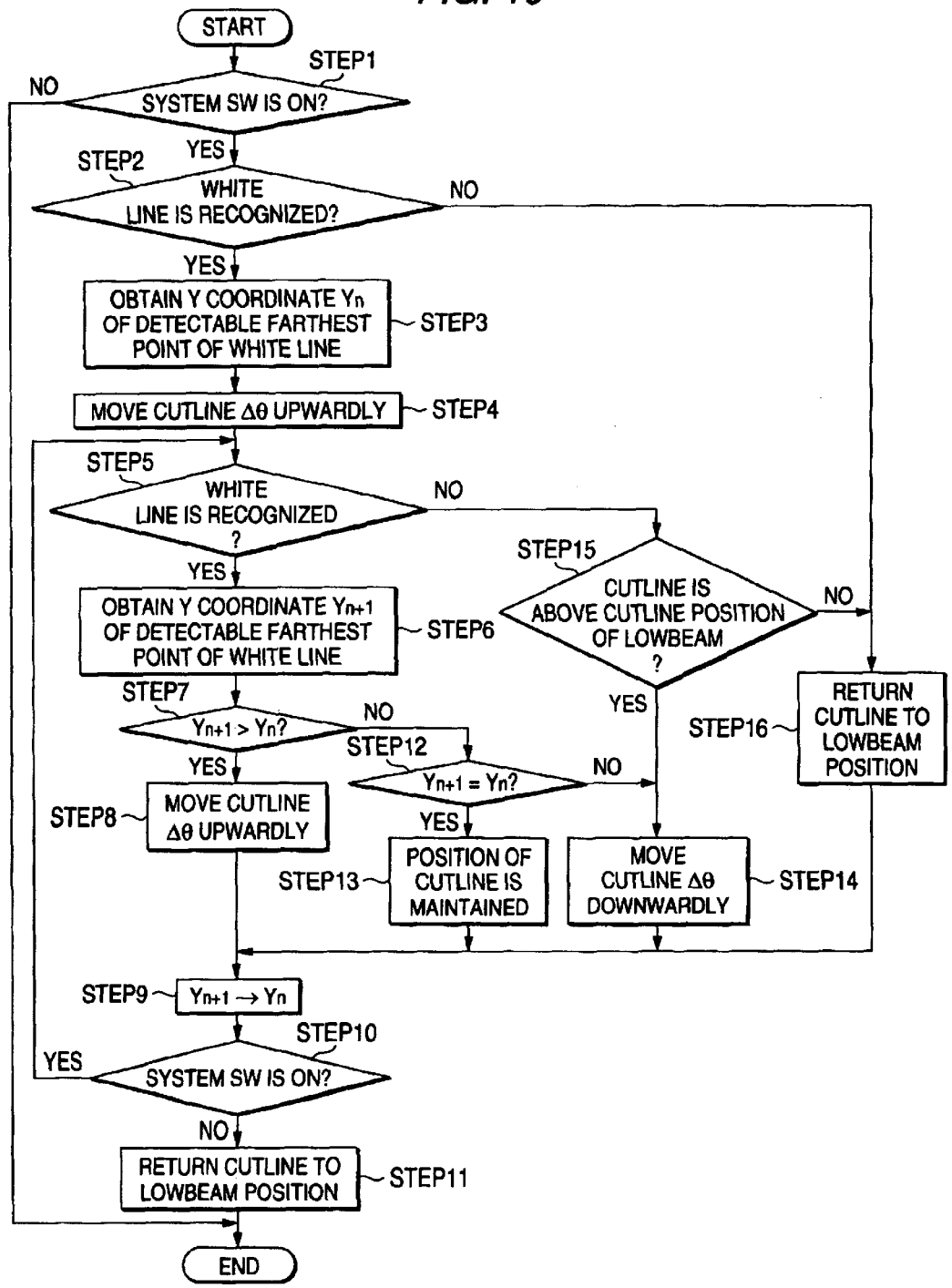
FIG. 10 is a flowchart which shows a control example of a cut-off line when no leading and oncoming vehicles are detected.

Next, referring to FIG. 10, a control when no leading and oncoming vehicles are detected ahead of the subject vehicle will be described. Note that a control example shown in FIG. 10 is a control example in which the cut-off line is controlled to be positioned below the position of the cut-off line of the low beam.

Firstly, in Step 1, whether or not a system switch is in the ON position is determined. The system switch is a switch for activating a program for controlling the cut-off line through a flowchart shown in FIG. 10, and for example, the system switch is turned on when a lighting switch for the headlamp system is manually turned on or when a headlamp lighting switch is turned on when a sensor detects that the environment becomes so dark that the headlamps need to be turned on.

Then, when the system switch is determined to be in the ON position in Step 1, advance to Step 2, where when the system switch is determined to be in the OFF position, then end the program.

In Step 2, whether or not white lines on the road are recognized is determined from an image obtained by the image capture means 15. Note that the recognition of white lines and a recognition of a road terminal end based on the recognition of white lines will be described by reference to FIGS. 11 and 12 later on.

When the white lines are determined to be recognized in Step 2, advance to Step 3, and when the white lines are determined not to be recognized in Step 3, then advance to Step 16.

In Step 3, a Y coordinate Yn (a position in a vertical direction on the image, which position is obtained from, for example, the number of pixels from a lowermost end of the image to the relevant point) of a detectable farthest point of the white line or a portion positioned uppermost in the image is obtained, and thereafter advance to Step 4.

In Step 4, the cut-off line is moved $\Delta\theta$ upwardly and then advance to Step 5. Here, $\Delta\theta$ is an angle for moving the cut-off line on the image by a distance corresponding to "1" in "$Y_{n+1}$" which is described in Step 9. Note that the "1" is a unit of pixels that are added to "$Y_n$" in a Y direction and is set in advance, for example, at 1 pixel, several pixels or several tens of pixels. The number of pixels which corresponds to this "1" is determined depending on minuteness (roughness) with which the cut-off line is controlled to be moved, and when a minute control is required, the number of pixels of "1" is made small, whereas a rough control is implemented, then the number of pixels of "1" is made large.

In Step 5, whether or not the white lines are recognized on the image is determined again, and when the white lines are recognized, then advance to Step 6, whereas when the white lines are not recognized, then advance to Step 15.

In Step 6, a Y coordinate Yn+1 of a detectable farthest point of the white line on the image is obtained, and then advance to Step 7.

In Step 7, whether or not "$Y_{n+1}>Y_n$" is determined, and when it is true, then advance to Step 8, whereas when it is not true, then advance to Step 12.

In the event that Yn+1 obtained in Step 6 is larger than $Y_n$ obtained in Step 3, since it means that the white lines are recognized above $Y_n$ by the cut-off line which is moved upwardly in Step 4, in Step 8, the cut-off line is moved upwardly another $\Delta\theta$, and then move to Step 9.

In Step 9, a numerical value attained by adding a single unit which uses a predetermined number of pixels as a unit to $Y_n$ obtained in Step 3 or "$Y_{n+1}$" is substituted as a new "$Y_n$", and then advance to Step 10.

In Step 10, whether or not the system switch is in the ON position is determined, and when the system switch is in the ON position, then return to Step 5, whereas when the system switch is in the OFF position, then advance to Step 11. When the system switch is in the ON position, whether or not a further upper portion of the image or a farther area of the white line is recognized is determined, and as long as farther areas of the white lines are recognized, the cut-off line continues to be controlled so as to be moved gradually upwardly.

In Step 11, the cut-off line is returned to the position of the low beam, and end the program. Namely, stop the control of the cut-off line. This is because there occurs a case where it is not preferable to continue to control to move the cut-off line upwardly even when the headlamps are illuminated. For example, in the event that a proper image cannot be obtained due to a bad weather or a stable image cannot be obtained due to a drastic change in posture of the vehicle body due to rough road surfaces, it is not preferable to control the cut-off line based on an image which is not clear or in which the position of an object changes frequently and largely, and therefore, it is better to turn off the system switch when such a condition occurs so as to move the cut-off line to the position of the low beam without implementing the control by the vehicle headlamp apparatus.

In Step 12, or when it is determined that "$Y_{n+1}>Y_n$" is not true from the determination in Step 7, whether or not "$Y_{n+1}=Y_n$" is determined, and when this is true, then advance to Step 13, whereas when it is not true, then advance to Step 14.

In Step 13, the position of the cut-off line is maintained, and then advance to Step 9. Namely, "$Y_{n+1}=Y_n$" means that even if the cut-off line continues to be raised in Step 4, no farther area of the white lines can be visualized, and hence there is no need to raise the cut-off line any further.

In Step 14, the cut-offline is moved $\Delta\theta$ downwardly. Namely, that both "$Y_{n+1}>Y_n$" and "$Y_{n+1}=Y_n$" are not true means that the white lines can be visualized only at positions which are lower than the conventional position and that a farther area than the area where the white lines can be viewed is illuminated, and therefore, the illuminating area needs to be lowered to attain a distance within which the white lines can be visualized. Then, advance to Step 9.

In Step 15, or when the white lines are determined not to be recognized in Step 5, whether or not the cut-off line is above the position of the cut-off line of the low beam is determined, and when the cut-off line is determined to be above the position of the cut-off line of the low beam, advance to Step 14, where the cut-off line is moved $\Delta\theta$ downwardly. On the contrary, when the cut-off line is determined not to be above the position of the cut-off line of the low beam, then advance to Step 16.

In Step 16, or when the white lines are determined not to be recognized in Step 2, or when the cut-off line is determined not to be above the cut-off line of the low beam in Step 15, the cut-off line is positioned at the position of the cut-off line of the low beam, and then advance to Step 9.

Next, whether or not the white lines are recognized is determined in Steps 2 and 5 of the flowchart shown in FIG. 10, and one of specific examples of the recognition of the white lines will be described by reference to FIGS. 11 and 12.

Firstly, a principle of a recognition of white lines will be described by reference to FIG. 12.

Figure 12:
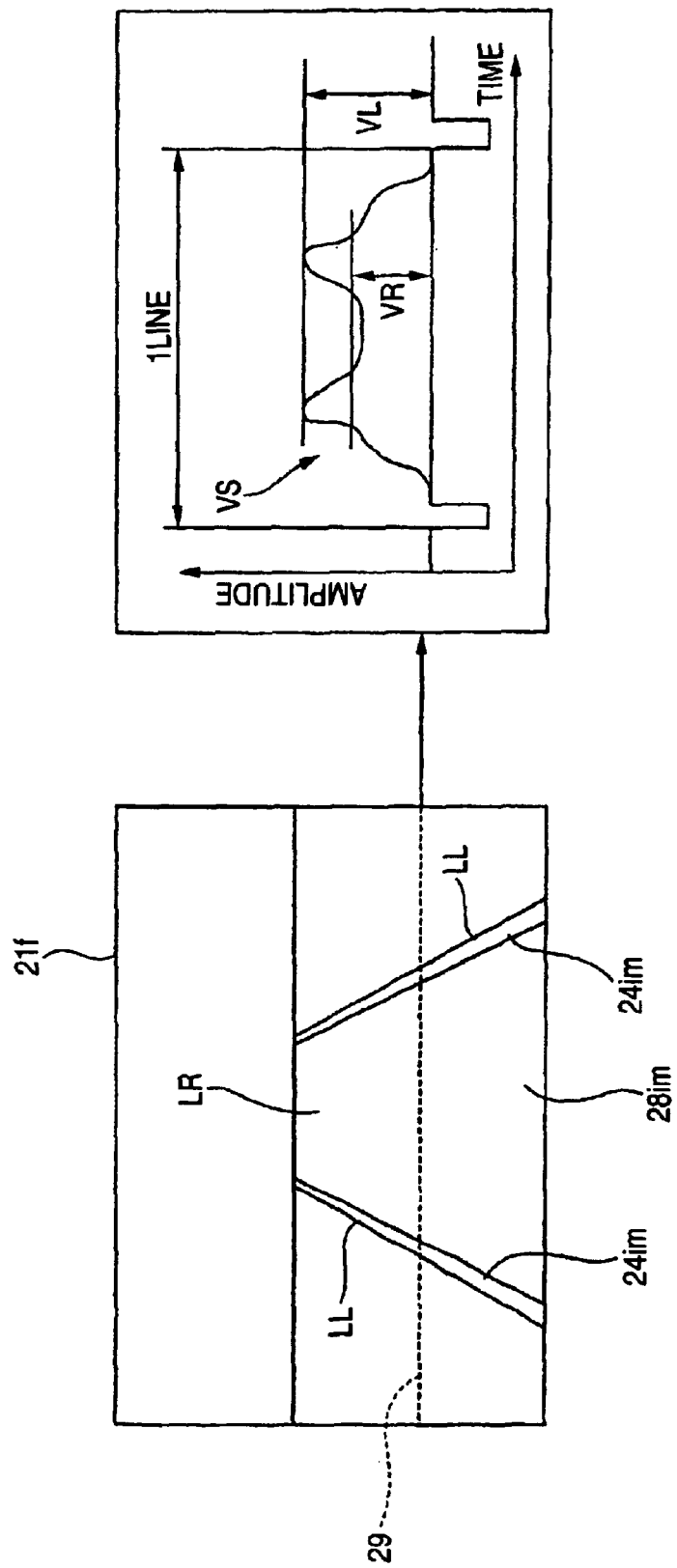
FIG. 12 is a drawing which shows a recognition principle of white lines based upon image information, an image being shown on a left side, and a waveform chart corresponding to a single line in the image shown on the left side being shown on a right side.

For example, assuming that an image 21f as shown on a left side of FIG. 12 by the image capture means 15. This image 21f constitutes an X-Y coordinate system in which an X coordinate is represented by an axis of abscissa and a Y coordinate by an axis of ordinate, and the positions of respective points on the image 21f are indicated by X-Y coordinates. In FIG. 21f, 28im denotes an image of a driving road surface, and 24im, 24im images of white lines (lane markings), and a horizontal broken line 29 denotes a line cursor.

In addition, in a waveform chart on a right side, VS is a video signal for one line of a portion where the line cursor 29 in the image 21 on the left side is located.

As is known, there is a correlation between the brightness of an object and an output voltage of a photographing element, and assuming that the brightness of the white lines 24im, 24im on the image 21f is LL and the brightness of the driving road surface 28im is LR, a voltage level of the video signal VS which corresponds to the brightness LL is VL, and a voltage level corresponding to the brightness LR is VR (<VL).

In recognizing the white lines 24im, 24im, since the contour of an edge portion is obtained, differential information VL−VR is calculated, and when the result of the calculation is higher than a certain threshold value, the relevant portion is determined to be an edge portion of the white line. By carrying out a process like this over the image 21, the contour of a constituent component in the image 21f can be extracted, and in the event that the contour so extracted substantially matches the characteristics of the white line, then that is determined to be the white line. Note that a method like this can be applied not only to the recognition of the white lines but also to the recognition of structures indicating a road boundary such as buildings and guar rails on the side of the road. Consequently, on a road provided with no white line, a road terminal end may be recognized by recognizing structures indicating a road boundary such as buildings and guar rails on the side of the road.

Figure 11:
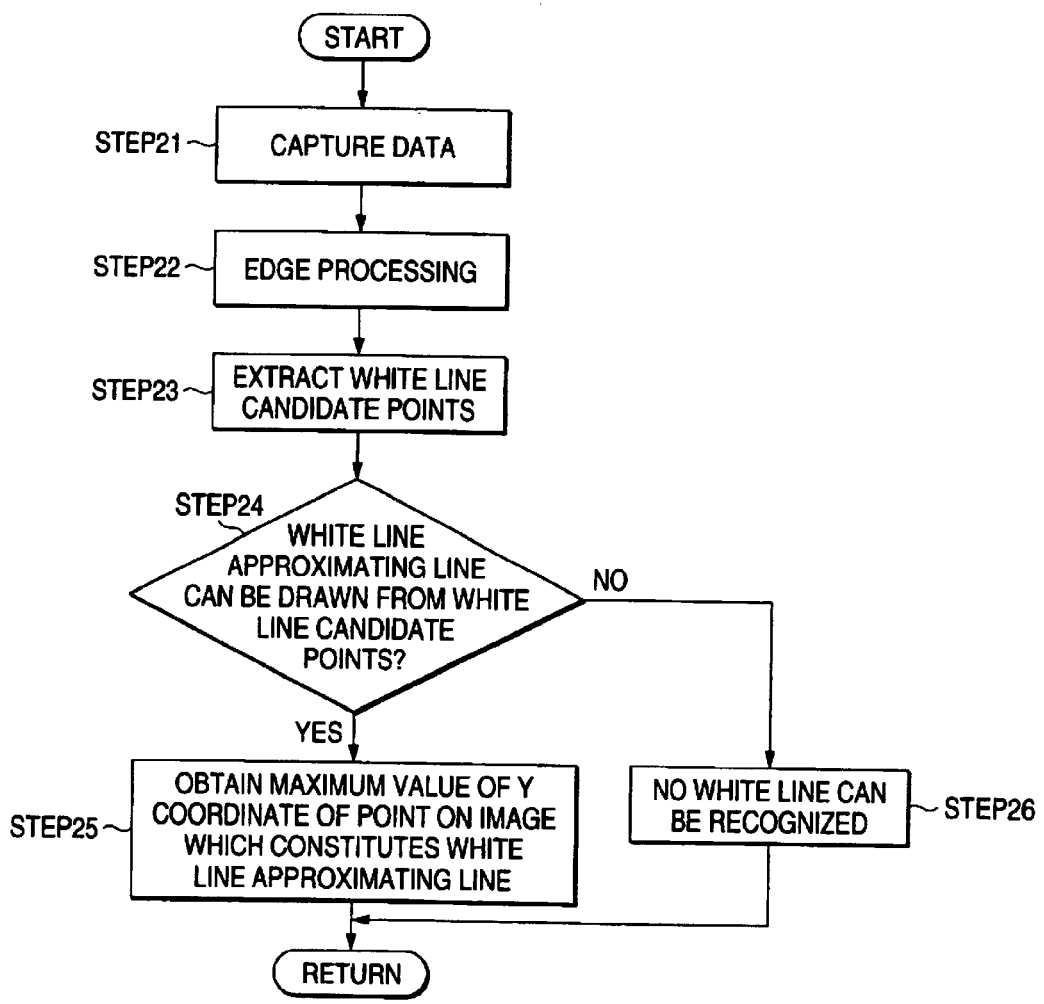
FIG. 11 is a flowchart showing procedures for implementing a white line recognition and a road terminal end recognition.

In a flowchart shown in FIG. 11, firstly, in Step 21, data of the image 21f shown on the left side of FIG. 12 are captured, and then advance to Step 22.

In Step 22, an edge processing is carried out for emphasizing the white lines based on the data obtained in Step 21, and advance to Step 23.

In Step 23, a white line candidate point is extracted from data obtained from the edge processing, and advance to Step 24.

In Step 24, whether or not a white line approximating line is drawn by a line attained by connecting white line candidate points in line is determined, and when such a white line approximating line is drawn, then advance to Step 25, whereas when such a white line approximating line is not drawn, then advance to Step 26. Note that the white line approximating line here means a line which is stored in advance as a line constituted by extracting characteristics of the white line, and on a straight road, the white line approximating line becomes an inclined straight line which converges on a center as it extends upwardly, whereas on a curved road, the white line approximating line becomes a line which draws a certain curve. Then, when the line which is drawn by connecting the white line candidate points in line is a line approximate to the white line approximating line, the white line is determined to be recognized.

In Step 25, a Y coordinate of a point which has a maximum Y coordinate among points constituting the white line approximating line in FIG. 21f is obtained, and end the process.

In Step 26, understanding that the white line is not recognized, end the process.

Figure 13:
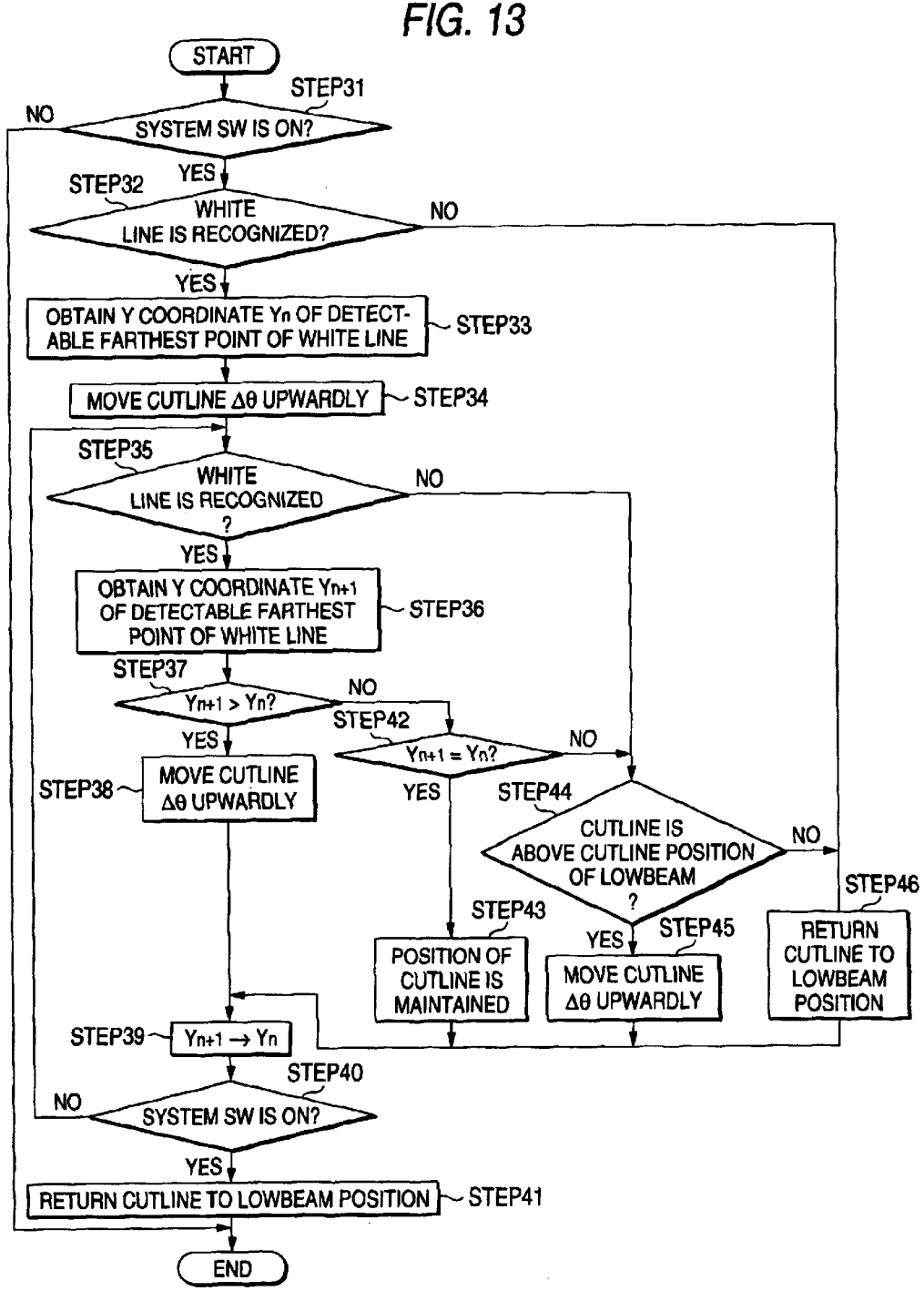
FIG. 13 is a flowchart showing another control example of a cut-off line when no leading and oncoming vehicles are detected.
Figure 14:
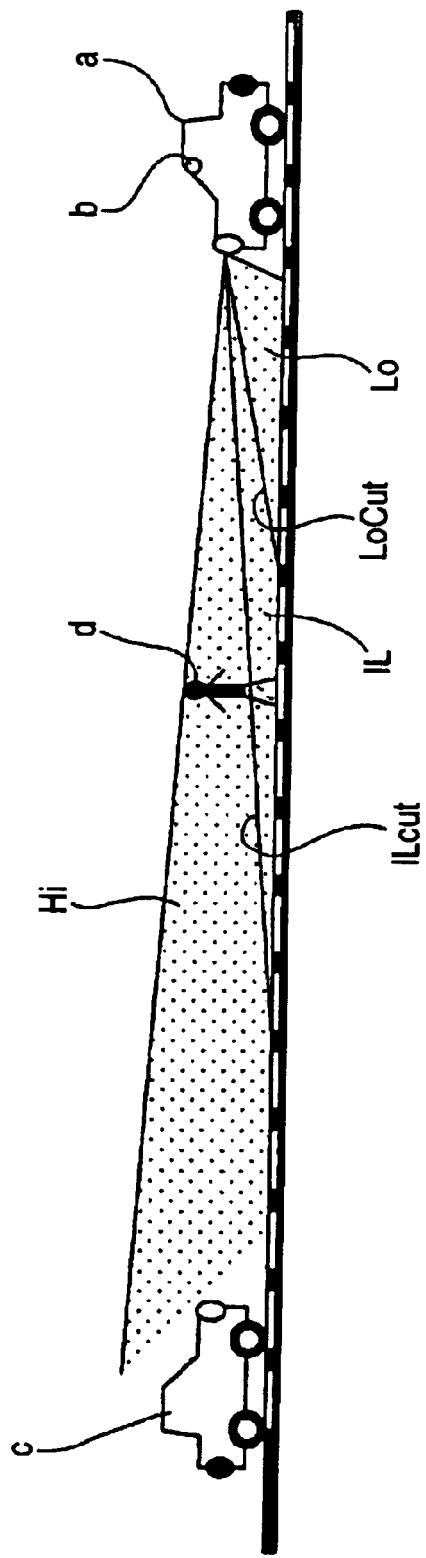
FIG. 14 is a drawing which describes a problem with a flat road driving which is inherent in a conventional vehicle headlamp apparatus.
Figure 15:
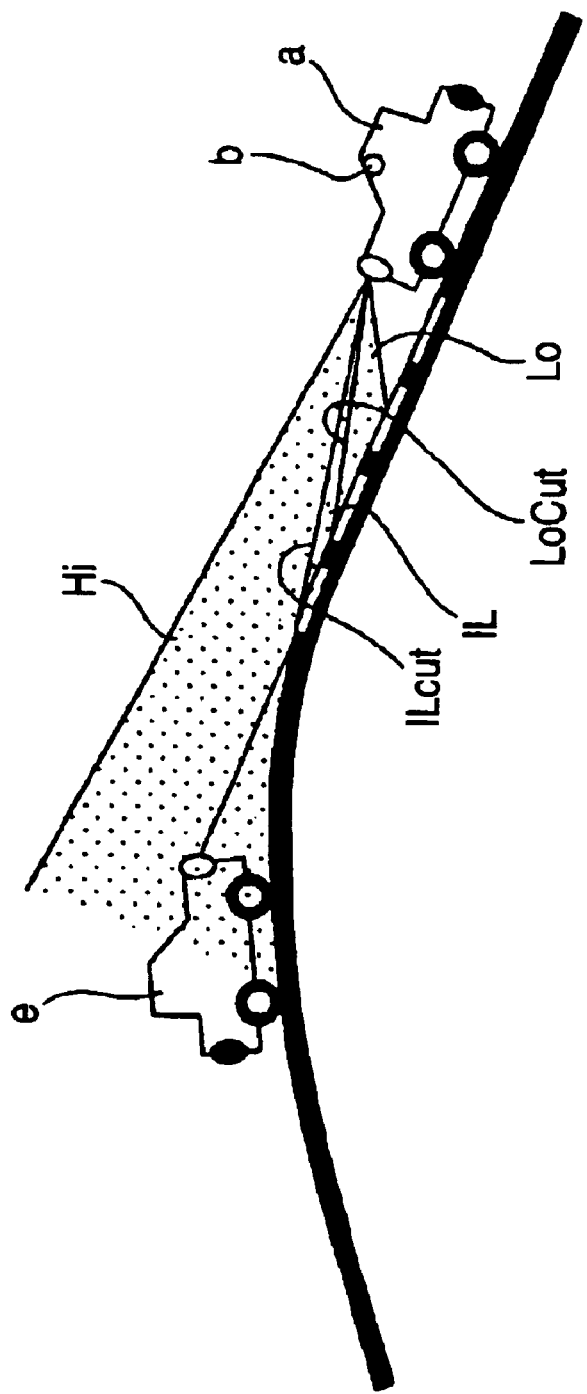
FIG. 15 is a drawing which describes a problem with a hill climbing which is inherent in the conventional vehicle headlamp apparatus.

Next, described by reference to FIG. 13 will be a control example in which no leading and oncoming vehicles are detected ahead of the subject vehicle but the cut-off line is not moved below the position of the cut-off line of the low beam.

Firstly, in Step 31, whether or not the system switch is in the ON position is determined. Then, when the system switch is determined to be in the ON position, then advance to Step 32, whereas when the system switch is determined to be in the OFF position, then end the program.

In Step 32, whether or not the white lines on the road are recognized from an image captured by the image capture means 15 is determined. When the white lines are determined to be recognized, then advance to Step 33, whereas when the white lines are determined not to be recognized, then advance to Step 46.

In Step 33, a Y coordinate $Y_n$ of a detectable farthest point of the white line is obtained, and advance to Step 34.

In Step 34, the cut-off line is moved $\Delta\theta$ upwardly, and advance to Step 35.

In Step 35, whether or not the white lines are recognized on the image is determined, and when the white lines are recognized, advance to Step 36, whereas when the white lines are not recognized, then advance to Step 44.

In Step 36, a Y coordinate $Y_{n+1}$ of a detectable farthest point of the white line on the image is obtained, and advance to Step 37.

In Step 37, whether or not "$Y_{n+1} > Y_n$" is true is determined, and when it is true, then advance to Step 37, whereas when not true, then advance to Step 42.

In Step 38, the cut-off line is moved another $\Delta\theta$ upwardly, and advance to Step 39.

In Step 39, a numerical value attained by adding a single unit which uses a predetermined number of pixels as a unit to $Y_n$ obtained in Step 33 or "$Y_{n+1}$" is substituted as a new "$Y_n$", and then advance to Step 40.

In Step 40, whether or not the system switch is in the ON position is determined, and when the system switch is in the ON position, then return to Step 35, whereas when the system switch is in the OFF position, then advance to Step 41.

In Step 41, the cut-off line is returned to the position of the low beam, and end the program. Namely, stop the control of the cut-off line. This is because there occurs a case where it is not preferable to continue to control to move the cut-off line upwardly even when the headlamps are illuminated. For example, in the event that a proper image cannot be obtained due to a bad weather or a stable image cannot be obtained due to a drastic change in posture of the vehicle body due to rough road surfaces, it is not preferable to control the cut-off line based on an image which is not clear or in which the position of an object changes frequently and largely, and therefore, it is better to turn off the system switch when such a condition occurs so as to move the cut-off line to the position of the low beam without implementing the control by the vehicle headlamp apparatus.

In Step 42, or when it is determined that "$Y_{n+1} > Y_n$" is not true from the determination in Step 37, whether or not "$Y_{n+1} = Y_n$" is determined, and when this is true, then advance to Step 43, whereas when it is not true, then advance to Step 44.

In Step 43, the position of the cut-off line is maintained, and then advance to Step 39.

In Step 44, whether or not the cut-off line is positioned above the cut-off line of the low beam is determined, and when the cut-off line is determined to be positioned above the cut-off line of the low beam, advance to Step 45, whereas the cut-off line is determined not to be positioned above the cut-off line of the low beam, then advance to Step 46.

In Step 45, the cut-off line is moved Δθ downwardly and then advance to Step 39.

In Step 46, or when the white lines are not recognized in Step 32, or when the cut-off line is determined not to be above the cut-off line of the low beam, the cut-off line is positioned at the position of the cut-off line of the low beam, and advance to Step 39.

As has been described heretofore, according to the vehicle headlamp apparatus 10 of the invention, the light distribution control suitable for the surrounding traffic environment and the road conditions is carried out despite the existence and non-existence of leading and oncoming vehicles, so that the visibility can be increased without running any risk of giving a glare to the surroundings. In particular, the driving safety of the subject vehicle can be ensured as much as possible without running any risk of giving a glare to the surroundings when there are no leading and oncoming vehicles.

Note that all the configurations and constructions of the respective portions shown in the embodiment of the invention are only examples showing specification required to be made when implementing the invention, and therefore, the technical range of the invention should not be construed in a limited fashion from the specific examples.

As is clear from what has been described heretofore, according to a first aspect of the invention, there is provided the vehicle headlamp apparatus comprising the headlamp for illuminating ahead of a vehicle, the image capture means for capturing an image ahead of the vehicle, the road terminal end determining means for determining the terminal end of the road ahead of the vehicle from the image captured by the image capture means, and the light distribution control means for varying the light distribution of the head lamp so as to illuminate a location which is determined to be the terminal end of the road by the road terminal end determining means.

Consequently, in the vehicle headlamp apparatus according to the invention, since when the terminal end of the road is determined, the location of the road which is determined to be the terminal end of the road is illuminated, the headlamp illuminates by no means a location which is too far to be determined to be the terminal end of the road from the image captured by the image capture means, and therefore, there is caused no risk that a glare is given to a vehicle which exists out of the detection area of the image capture means, as well as a vehicle which suddenly appears from the opposite side of the hill to the subject vehicle at the top thereof. Moreover, a farthest point of the detection area of the image capture means ahead of the subject vehicle can be illuminated as long as no leading and ongoing vehicles exist ahead of the subject vehicle, whereby the traffic safety of the subject vehicle is ensured.

According to a second aspect of the invention, there is provided a vehicle headlamp apparatus as set forth in the first aspect of the invention, comprising a leading vehicle/oncoming vehicle recognition means for recognizing a leading vehicle or an oncoming vehicle from the image captured by the image capture means, wherein the light distribution is varied to be directed downward when the leading vehicle/oncoming vehicle recognition means recognizes a leading vehicle or a noncoming vehicle. Thus, there is no risk that a glare is given to the oncoming vehicle and the leading vehicle.

According to a third aspect of the invention, there is provided a vehicle headlamp apparatus as set forth in the first or second aspect of the invention, wherein the variation of the light distribution is implemented gradually. Thus, there is caused no risk that the drivers of the leading and oncoming vehicles, pedestrians and the driver of the subject vehicles are made to feel uneasiness immediately there occurs a drastic change in light distribution.

What is claimed is:

1. A vehicle headlamp apparatus comprising:
   a headlamp for illuminating ahead of a vehicle;
   image capture means for capturing an image ahead of the vehicle;
   road terminal end determining means for determining a terminal end of a road ahead of the vehicle from the image captured by the image captured means; and
   light distribution control means for varying a light distribution of the head lamp so as to illuminate an area ahead of the vehicle about as far as a location which is determined to be the terminal end of the road by the road terminal end determining means.

2. A vehicle headlamp apparatus as set forth in claim 1, further comprising leading vehicle/oncoming vehicle recognition means for recognizing a leading vehicle or an oncoming vehicle from the image captured by the image capture means,
   wherein the light distribution is varied to be directed downward when the leading vehicle/oncoming vehicle recognition means recognizes a leading vehicle or an oncoming vehicle.

3. A vehicle headlamp apparatus as set forth in claim 1, wherein the variation of the light distribution is implemented gradually.

4. A vehicle headlamp apparatus as set forth in claim 2, wherein the variation of the light distribution is implemented gradually.

5. A vehicle headlamp apparatus as set forth in claim 2, wherein an optical axis of the headlamp is swiveled according to a traveling path or road which is estimated from a steered angle of a steering wheel or the image capture means while the cut-off line remains raised.

6. A vehicle headlamp apparatus as set forth in claim 1, wherein light distribution control means includes a driving means which controls a vertical movement of a cut-off line of the headlamp.

7. A vehicle headlamp apparatus as set forth in claim 6, wherein the cut-off line is controlled separately for a subject vehicle driving lane and an oncoming vehicle driving lane.

8. A vehicle headlamp apparatus as set forth in claim 1, wherein a center axis of the image capture means is disposed to become parallel with an optical axis of the headlamp.

9. A vehicle headlamp apparatus as set forth in claim 7, wherein the center axis of the image capture means is disposed at the same height as that of the optical axis of the headlamp.

10. A vehicle headlamp apparatus as set forth in claim 1, wherein recognition of the terminal end of the road is implemented based on a white line of the road.

11. A vehicle headlamp apparatus as set forth in claim 1, wherein recognition of the terminal end of the road is implemented based on a structure indicating a road boundary.

* * * * *